United States Patent [19]

Swartz

[11] Patent Number: 4,991,129

[45] Date of Patent: Feb. 5, 1991

[54] DUAL MODE ACTUATOR FOR DISK DRIVE USEFUL WITH A PORTABLE COMPUTER

[75] Inventor: Jack S. Swartz, San Jose, Calif.

[73] Assignee: Areal Technology, Inc., San Jose, Calif.

[21] Appl. No.: 385,174

[22] Filed: Jul. 25, 1989

[51] Int. Cl.⁵ .............................. G06F 1/00
[52] U.S. Cl. ..................... 364/707; 307/29; 360/69; 360/137
[58] Field of Search ............ 360/69, 75, 137; 363/59, 60; 307/29; 364/707

[56] References Cited

U.S. PATENT DOCUMENTS

| | | | |
|---|---|---|---|
| 3,248,633 | 4/1966 | Guarrera | 363/59 X |
| 3,997,832 | 12/1976 | Tanaka et al. | 363/60 |
| 4,404,624 | 9/1983 | Yamazaki | 363/59 |
| 4,429,975 | 2/1984 | Shiozawa et al. | 307/29 X |
| 4,475,047 | 10/1984 | Ebert, Jr. | 364/707 X |
| 4,684,864 | 8/1987 | Morimoto | 318/696 |
| 4,698,578 | 10/1987 | Mullerswan et al. | 320/13 |
| 4,890,212 | 12/1989 | Kumon et al. | 307/29 X |
| 4,907,183 | 3/1990 | Tanaka | 364/707 |
| 4,931,889 | 6/1990 | Osafune | 360/69 X |
| 4,933,785 | 6/1990 | Morehouse et al. | 360/78.04 |

Primary Examiner—Aristotelis M. Psitos
Assistant Examiner—David L. Robertson
Attorney, Agent, or Firm—Nathan N. Kallman

[57] ABSTRACT

A portable computer having an associated disk drive includes a voltage multiplier coupled between a microprocessor and a head positioning actuator that operates in two modes. In a moderate performance mode, the dual mode actuator operates with the power supplied by a storage battery or by a commercial power source with the voltage multiplier turned off. In a high performance mode, the voltage multiplier under control of the microprocessor boosts the voltage supplied to the actuator so that more power is made available for fast head positioning and job execution with an improvement in computer performance.

9 Claims, 1 Drawing Sheet

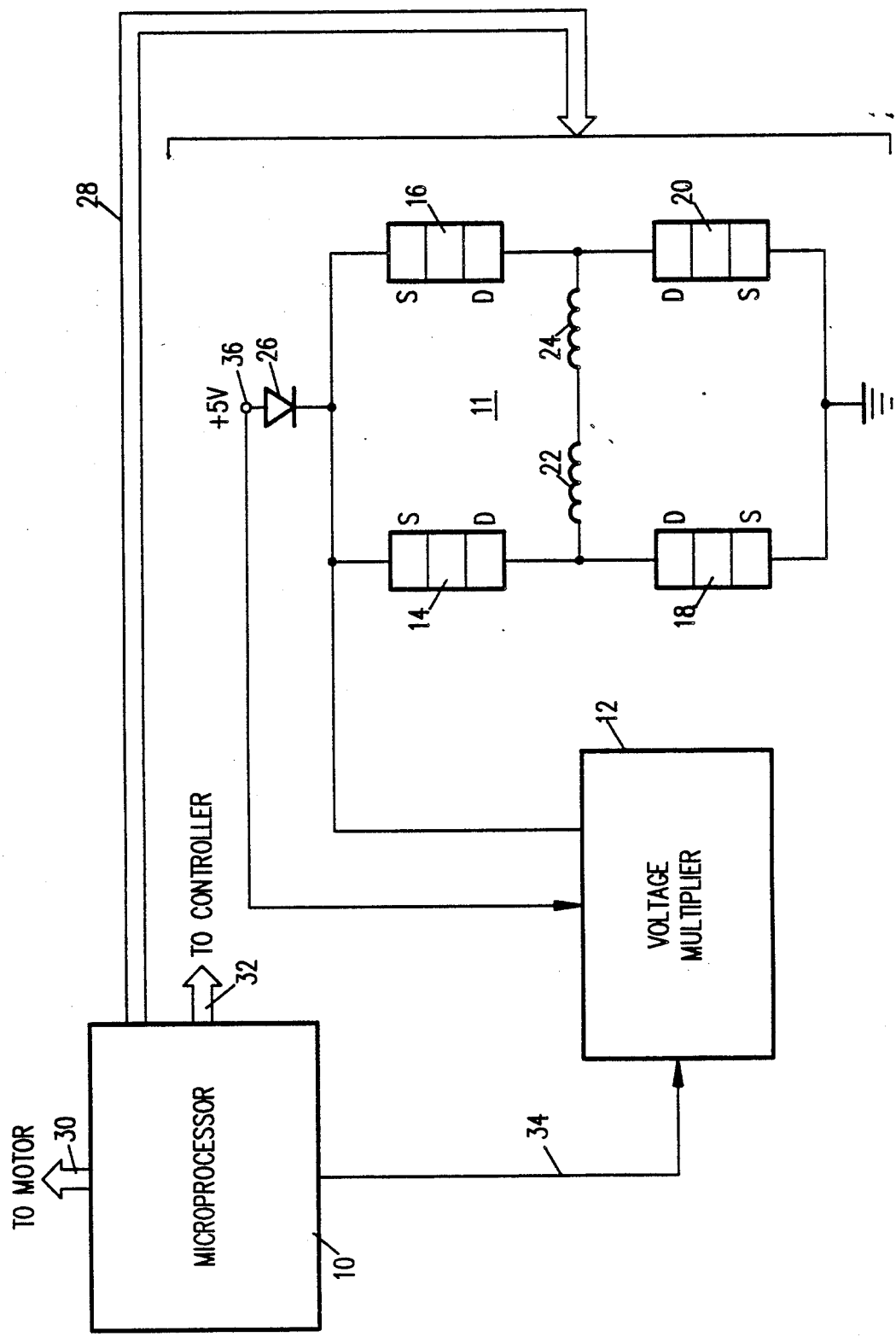

DUAL MODE ACTUATOR FOR DISK DRIVE USEFUL WITH A PORTABLE COMPUTER

FIELD OF THE INVENTION

This invention relates to a portable computer, and in particular to a dual mode actuator for use with a disk drive associated with a portable computer.

BACKGROUND OF THE INVENTION

With present day technology, the need for lightweight portable computers, such as laptop and notebook type computers, has increased extensively. Portable computers need to have low weight as well as being compact, so that the user can carry and transport the computer from one location to another without difficulty. A significant part of the weight of the computer is the battery that provides the power necessary for operating the portable computer when a commercial power outlet is not available. When a standard commercial power source or outlet, providing 110 volts or 120 volts, is available, there is sufficient power to achieve high performance operation, with or without utilizing the battery. If a commercial power supply is not readily available, the portable computer is dependent on the power provided by the battery which is incorporated in the computer apparatus.

When a small battery is used to reduce weight and cost, a relatively low voltage and small magnitude of current is available for use. A low current supply results in an increase in time required for job execution by the disk drive, such as positioning the magnetic head arm assembly to access selected data tracks on the surface of a magnetic disk.

For head positioning operation in a disk drive, current is supplied to a head actuator comprising a winding or coil which is located within a magnetic field provided by permanent magnets or pole pieces. The head actuator is coupled to a head arm which supports a magnetic transducer for coaction with the surface of a magnetic disk for recording and reading data. The direction of current in the coil determines the direction of radial travel of the head arm and transducer relative to the circular data tracks on the disk surface. The speed of head positioning to access the selected data tracks is dependent on the power supplied to the head actuator. To achieve high performance operation, particularly when a hard disk drive is used with the portable computer, a large amount of power greater than the power provided by the conventional battery supply is required.

SUMMARY OF THE INVENTION

An object of the invention is to provide a lightweight portable computer that employs relatively smaller batteries than those conventionally used with portable computers.

Another object of the invention is to provide a portable computer having a disk drive that realizes fast job execution and fast head positioning with battery use.

Another object is to provide a high performance actuator for a disk drive that operates in two modes with a battery of reduced size and weight.

In accordance with this invention, a portable computer comprises a disk drive incorporating a head positioning actuator that is operable in two modes. In a first operating mode, designated the high performance mode, fast head accessing time is made possible. In a second mode, the moderate performance mode, the head actuator operates more slowly with lower performance than the first mode. To achieve the high performance operation, a power control circuit including a voltage multiplier acts to switch the actuator between the operating modes in response to a microprocessor.

When operating the disk drive, if an AC commercial supply is available, the actuator is operated normally in the high performance mode with the voltage multiplier on. In such case, the use of AC power with high power consumption is not of the same concern as when using a battery supply with the attendant depletion of stored battery power. With the availability of commercial power, there is no need to operate in the moderate performance mode.

However, in the absence of an AC commercial power supply, the actuator can be operated in the high performance mode with battery power only by switching the voltage multiplier on, in keeping with this invention. In such case, the actuator will be capable of fast access and job execution, although there will be high power consumption and rapid depletion of the stored battery power resulting in reduced battery life. When operating in this mode with the battery as a source of power, it is contemplated that the job executions will be of relatively short duration. Normal operation of the actuator in the moderate performance mode can be effectuated with the multiplier switched off when using battery power in the absence of AC commercial power. In this mode, the battery is subject to moderate power consumption but operates at a lower level of performance. Although the actuator operates at a lower performance level and head accessing is relatively slow and not optimum, battery life is extended.

In this manner, the voltage and current used for operating the actuator are boosted so that disk drive functions and job execution, such as head positioning, are implemented at faster speeds than when operating with the rated battery power directly. The microcomputer is provided to control the switching between the modes, and to provide signals to the disk drive and the disk drive controller.

BRIEF DESCRIPTION OF THE DRAWING

The invention will be described in greater detail with reference to the sole FIGURE of the drawing, which is a schematic circuit and block diagram of a dual mode actuator apparatus provided with a portable computer, in accordance with this invention.

DETAILED DESCRIPTION OF THE INVENTION

With reference to the drawing dual mode actuator 11 for positioning a magnetic head during track accessing in a disk drive comprises coils 22 and 24. The series connected coils 22 and 24 are positioned within a magnetic field provided by permanent magnets or pole pieces (not shown). One end of coil 22 is connected to a junction between field effect transistors (FETs) 14 and 18, and one end of coil 24 is connected to a junction between FETs 16 and 20. A voltage supply 36, which in this implementation is a battery contained in the portable computer, provides a positive voltage, such as +5 volts for example, through a forward bias diode 26 to a junction between the source electrodes of FETs 14 and 16. The battery is incorporated in the portable computer apparatus. A source of reference potential, such as ground, is tied to a junction between FETs 18 and 20.

A microprocessor 10 provides control signals to the actuator circuit including commands for head positioning via control lines 28. The microprocessor 10 also provides signals to a controller via cable lines 32 for recording information signals on or reading information signals from selected tracks of the rotating disk. The microprocessor 10 also controls the rotary speed of the disk drive motor via lines 30.

In accordance with this invention, a voltage multiplier 12 is connected between the microprocessor and the actuator circuit. The voltage multiplier is connected to the microprocessor by control line 34 to receive control signals which will determine the mode of operation of the dual mode actuator. The voltage multiplier 12 is connected to the battery supply to receive the battery voltage so that the voltage can be boosted and increased power can be supplied to the actuator circuit when the microprocessor activates the multiplier circuit to operate in the power boost mode. The voltage multiplier 12 is connected to the junction between the FETs 14 and 16 to provide the desired increased power to the actuator circuit when the microprocessor activates the voltage multiplier. When activated, the voltage multiplier, which may be a full wave voltage doubler, effectively boosts the voltage available for operation of the disk drive and increases the maximum current that can be applied to the actuator. As a result, the time required for head positioning and track accessing is significantly reduced.

The disk drive associated with the portable computer can be designed so that the microprocessor 10 controls the coarse seek algorithms. Thus, the selection of the mode to be used can be designed to operate automatically depending upon which source of power is being employed. When a low voltage battery is used, which is common with laptop computers, the microprocessor senses the voltage supplied to the actuator and energizes the multiplier 12, if the level of current across the coils is insufficient to provide the desired high performance operation. It should be understood that manual control as well as automatic control can be provided by a microprocessor program for implementing the voltage boost by means of the voltage multiplier, in accordance with this invention. Other modifications can be made to the configuration and the parameters of the dual mode actuator within the scope of this invention.

What is claimed is:

1. A portable computer having an associated disk drive including a magnetic head assembly and at least one rotatable magnetic disk comprising:
    a dual mode actuator for positioning said magnetic head assembly;
    a microcomputer coupled to said actuator for controlling the positioning of said head assembly relative to tracks on a disk surface;
    means for supplying electrical power to said actuator;
    a voltage multiplier coupled to said power supply means and between said microcomputer and said actuator for boosting the power to said actuator in one mode in response to a control signal from said microcomputer, said multiplier being inactive in a second mode.

2. A portable computer as in claim 1, wherein said power supply means is a storage battery or a commercial power supply.

3. A portable computer as in claim 1, wherein said actuator comprises electrical coil means disposed in a magnetic field so that said head assembly is moved for positioning when current is passed to said coil means.

4. A portable computer as in claim 3, wherein said actuator comprises first, second, third and fourth field effect transistors, the source electrodes of said first and second transistors being coupled to said power supply and the source electrodes of said third and fourth transistors being coupled to a source of reference potential.

5. A portable computer as in claim 4, including a diode coupled between said power supply and a junction between said first and second transistors.

6. A portable computer as in claim 3, wherein said coil means comprises series connected first and second coils, an end of said first coil being connected to a junction between said first and third coils, and an end of said second coil being connected to a junction between said second and fourth coils.

7. A portable computer as in claim 1, including means coupled to said microprocessor for controlling the rotary speed of said disk.

8. A portable computer as in claim 1, including means coupled to said microprocessor for providing signals to a disk drive controller.

9. A portable computer as in claim 1, including means for sensing the voltage supplied to said actuator.

* * * * *